US010135768B2

(12) United States Patent
Shin

(10) Patent No.: US 10,135,768 B2
(45) Date of Patent: Nov. 20, 2018

(54) METHOD AND COMPUTER-READABLE RECORDING MEDIUM FOR MANAGING SENT MESSAGE IN MESSENGER SERVER

(71) Applicant: Samsung Electronics Co., Ltd., Gyeonggi-do (KR)

(72) Inventor: Jae-Young Shin, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 140 days.

(21) Appl. No.: 14/291,260

(22) Filed: May 30, 2014

(65) Prior Publication Data

US 2015/0134753 A1 May 14, 2015

(30) Foreign Application Priority Data

Nov. 11, 2013 (KR) .......................... 10-2013-0136254

(51) Int. Cl.
*H04L 12/58* (2006.01)

(52) U.S. Cl.
CPC .................................. *H04L 51/14* (2013.01)

(58) Field of Classification Search
CPC ......... H04W 4/12; H04W 4/14; H04W 4/008; H04L 51/04; H04L 51/043; H04L 51/14
See application file for complete search history.

(56) References Cited

U.S. PATENT DOCUMENTS

| 8,260,265 B1* | 9/2012 | Mayblum ......... H04M 1/72552 |
| | | 370/352 |
| 2002/0120697 A1 | 8/2002 | Generous et al. |
| 2004/0153483 A1* | 8/2004 | Cox ........................ H04L 51/38 |
| 2008/0313297 A1* | 12/2008 | Heron .................... H04L 12/581 |
| | | 709/207 |
| 2011/0271202 A1* | 11/2011 | Wong ..................... G06Q 10/10 |
| | | 715/752 |
| 2012/0058786 A1* | 3/2012 | Schatzmayr ............ H04L 51/34 |
| | | 455/466 |
| 2013/0325922 A1* | 12/2013 | Chaudhri ............... G06Q 10/10 |
| | | 709/203 |
| 2013/0339436 A1* | 12/2013 | Gray ....................... H04L 51/24 |
| | | 709/204 |
| 2014/0047019 A1* | 2/2014 | Midtun ................. H04L 51/043 |
| | | 709/204 |
| 2014/0244714 A1* | 8/2014 | Heiby ..................... H04L 51/24 |
| | | 709/203 |

(Continued)

FOREIGN PATENT DOCUMENTS

JP 2007-241586 A 9/2007
KR 10-2010-0124157 A 11/2010

*Primary Examiner* — Cheikh Ndiaye
(74) *Attorney, Agent, or Firm* — Cha & Reiter, LLC

(57) ABSTRACT

A method and computer readable recording medium having a program for managing sent messages in a messenger server includes receiving a message to be transmitted to a user terminal associated with a user account, the message received from a second user terminal associated with a second user account, inserting into the message information indicating an inactive status, and transmitting the message including the information to the user terminal, wherein the information causes the user terminal to disable a message notification function.

19 Claims, 5 Drawing Sheets

(56) References Cited

U.S. PATENT DOCUMENTS

| | | | |
|---|---|---|---|
| 2015/0081804 A1* | 3/2015 | Banatwala | H04L 51/043 709/206 |
| 2015/0149566 A1* | 5/2015 | Shmilov | H04W 4/12 709/206 |
| 2015/0149567 A1* | 5/2015 | Shmilov | H04W 4/12 709/206 |

* cited by examiner

| USER | CONNECTED TERMINAL | CONNECTION STATUS | LAST MESSAGE TRANSFER TIME |
|---|---|---|---|
| USER A | A1 | ACTIVE | 17 : 23 : 38 |
|  | A2 | INACTIVE | - |
| USER B | B | ACTIVE | 17 : 15 :23 |
| ⋮ | ⋮ | ⋮ | ⋮ |

METHOD AND COMPUTER-READABLE RECORDING MEDIUM FOR MANAGING SENT MESSAGE IN MESSENGER SERVER

CROSS-REFERENCE TO RELATED APPLICATION

This application claims the benefit under 35 U.S.C. § 119(a) of a Korean patent application filed in the Korean Intellectual Property Office on Nov. 11, 2013 and assigned Serial No. 10-2013-0136254, the entire disclosure of which is incorporated herein by reference.

TECHNICAL FIELD

The present disclosure relates to a method and computer-readable recording medium for managing sent messages in a messenger server, to manage messages being sent in a messenger service in which multiple devices are connected.

BACKGROUND

Recently, users may communicate with each other through homepages, e-mails, phones and the like. The homepages and the e-mails may not guarantee real-time communication between users. Although direct calls via phone may guarantee excellent real-time communication between users, they may undesirably increase the user's burden with respect to communication costs.

The instant messenger as an efficient way to transfer information in real time over the Internet. The instant messenger aims at real-time delivery of simple messages between users. The instant messenger may allow two users to talk to each other in real time through text messages delivered, as if they were talking to each other directly. The instant messenger immediately forwards the received information or messages according to its real-time characteristics.

As the messenger service has expanded from the existing Personal Computer (PC)-based messenger and Short Message Service (SMS) service to Internet Protocol (IP)-based mobile messengers, various mobile messengers have been serviced competitively. In addition, as user terminals (e.g., mobile devices) have been personalized and in many cases, one user may use multiple devices at the same time, services for multiple devices have been provided.

For example, when one user uses two or more user terminals at the same time, the user may simultaneously use one messenger service through multiple user terminals. In this case, for the conversation partner of the messenger service, the user is perceived as the same one user, but the messenger service may be provided to the same user through multiple user terminals.

When a user uses a mobile messenger in this multi-device environment, a received message may be delivered to all the user terminals of the user, possibly causing a plurality of associated alarms, vibrations, pop-up messages and the like may be triggered. In this situation, even though the user wants to send and receive a message on one user terminal, the message may be received even on the other user terminals, so its associated alarm, vibrations or pop-up message may be generated on the other user terminals as well, causing inconvenience to the user. Further, additional battery consumption may occur due to the unwanted message reception notification, affecting the basic performance of the user terminals.

In addition, when the currently used user terminal has sent a message, the user terminal may not be synchronized in real time with the other user terminals connected as multiple devices, so a polling procedure should be performed periodically.

The above information is presented as background information to assist with an understanding of the present disclosure. No determination has been made, and no assertion is made, as to whether any of the above might be applicable to the present disclosure.

SUMMARY

Accordingly, an aspect of the present disclosure is to provide a method and computer-readable recording medium for managing sent messages in a messenger server, to provide message reception notification to the currently used user terminal by distinguishing the currently used user terminal from unused user terminals.

Another aspect of the present disclosure is to provide a method and computer-readable recording medium for managing sent messages in a messenger server, to ensure real-time synchronization between multiple user terminals with respect to message-read processing by distinguishing the currently used user terminal from unused user terminals.

In accordance with an aspect of the present disclosure, there is provided a method for managing sent messages in a messenger server. The method includes receiving a message from a first user terminal, the first user terminal associated with a first user account, detecting at least one destination terminal from among a plurality of user terminals associated with the first user account, transmitting the received message to the detected destination terminal.

In accordance with another aspect of the present disclosure, there is provided a method for managing sent messages in a messenger server in sending a message between a plurality of user terminals connected with a first user account and a user terminal connected with a second user account. The method includes receiving a message to be transmitted to a user terminal associated with a user account, the message received from a second user terminal associated with a second user account, inserting into the message information indicating an inactive status, and transmitting the message including the information to the user terminal, wherein the information causes the user terminal to disable a message notification function.

In accordance with another aspect of this invention a computer-readable recording medium is disclosed. The computer readable medium stores a program that, when executed by a computer processor, causes the processor to: receive a message to be transmitted to a user terminal associated with a user account, the message received from a second user terminal associated with a second user account, insert into the message information indicating an inactive status, and transmit the message including the information to the user terminal, wherein the information causes the user terminal to disable a message notification function.

The disclosure will become apparent to those skilled in the art from the following detailed description, which, taken in conjunction with the annexed drawings, discloses example embodiments of the disclosure.

BRIEF DESCRIPTION OF THE DRAWINGS

The example embodiments of the present disclosure will be more apparent from the following description taken in conjunction with the accompanying drawings, in which.

Throughout the drawings, like reference numerals may be understood to refer to like parts, components, and structures.

DETAILED DESCRIPTION

The following description with reference to the accompanying drawings is provided to assist in an understanding of example embodiments of the disclosure as defined by the claims and their equivalents. It includes various details to assist in that understanding, but these are to be regarded as mere examples. Accordingly, those of ordinary skilled in the art will recognize that various changes and modifications of the embodiments described herein can be made without departing from the ambit of the disclosure. In addition, descriptions of well-known functions and implementations may be omitted for clarity and conciseness.

In order to enable those skilled in the art to easily implement the present disclosure, embodiments of the present disclosure will be described in detail with reference to the accompanying drawings.

Figure 1:
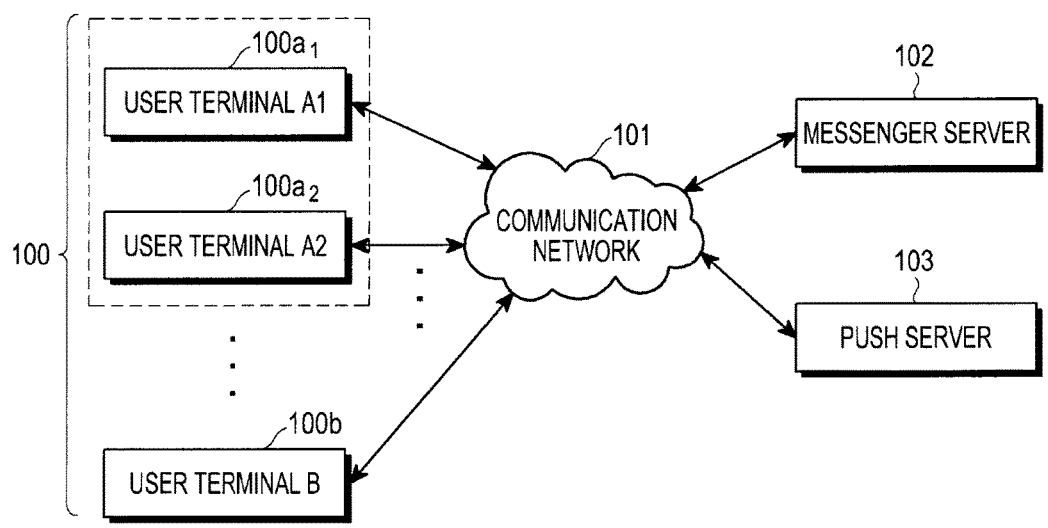
FIG. 1 illustrates an example messenger system providing a multi-device environment according to an embodiment of the present disclosure.

FIG. 1 illustrates an example messenger system according to an embodiment of the present disclosure. Referring to FIG. 1, the messenger system may include user terminals 100, a communication network 101, a messenger server 102 and a push server 103. Upon request for conversation with another user from each of the user terminals 100, the messenger server 102 may determine the presence/absence of the other party (or conversation partner), generate a mutual communication channel, and provide a messenger service. If the communication channel is generated between a first user terminal $100a_1$ or $100a_2$), and a second user terminal 100b, a message being sent from each user terminal may be sent to the other party's user terminal through the messenger server 102.

According to an embodiment of the present disclosure, a user A may use the messenger service on a plurality of user terminals (e.g., a user terminal A1 $100a_1$ and a user terminal A2 $100a_2$). Accordingly, if the user A sends a message to the user terminal B 100b via the user terminal A1 $100a_1$, the message may be sent to the messenger server 102 over the communication network 101, and the messenger server 102 may send the message back to the user terminal B 100b over the communication network 101. If the user terminal B 100b is not connected (e.g., not TCP-connected) to the messenger server 102, the message may be sent to the user terminal B 100b through the push server 103 as a push message.

Because the user terminal A1 $100a_1$ and the user terminal A2 $100a_2$ are simultaneously connected to the messenger server 102, the message that is sent from the user terminal A1 $100a_1$ to the user terminal B 100b may also be sent to the user terminal A2 $100a_2$. Such messages sent to a second user terminal operated by the same user will be referred to as "mirror messages."

If the user terminal A2 $100a_2$ is an unused state (e.g., in the 'Inactive' status), the user terminal A2 $100a_2$ may disable message reception notification (e.g., an alarm, vibrations, a pop-up message and the like). For example, an identifier indicating the 'Inactive' status may be added to the message that is sent to the user terminal A2 $100a_2$. The user terminal A2 $100a_2$ may disable a notification function mode in response to receiving the message having the identifier.

According to another embodiment of the present disclosure, if the user B sends a message to the user terminal A using the user terminal B 100b, the message may be sent to the messenger server 102 over the communication network 101, and the messenger server 102 may send the message back to the user terminal A 100a over the communication network 101. In the case of the multi-device situation in which the user A is simultaneously connected to the messenger service using the plurality of user terminals, the sent message may be simultaneously sent to the user terminal A1 $100a_1$ and the user terminal A2 $100a_2$.

According to an embodiment of the present disclosure, when the user terminal A1 $100a_1$ is in an 'Active' status and the user terminal A2 $100a_2$ is in the 'Inactive' status, the user terminal A1 $100a_1$ may receive the message through the messenger server 102, and the user terminal A2 $100a_2$ may receive the same through the push server 103 in the form of a push message. Since the user terminal A2 $100a_2$ 'Inactive,' the user terminal A2 $100a_2$ may have the message reception notification disabled (e.g., an alarm, vibrations, a pop-up message and the like). For example, an identifier indicating the 'Inactive' status may be added in the message that is sent to the user terminal A2 $100a_2$, and the user terminal A2 $100a_2$ may thus disable a notification function mode upon receiving the message with the added identifier.

The communication network 101 may be configured as a variety of communication networks such as a Personal Area Network (PAN), a Local Area Network (LAN), a Metropolitan Area Network (MAN), a Wide Area Network (WAN), and the like, regardless of its communication type (e.g., wired communication or wireless communication,). The communication network 101 may be the known World Wide Web (WWW), and may also use wireless transmission technology used for short-range communication, such as Infrared Data Association (IrDA) and Bluetooth.

Figures 2, 3:
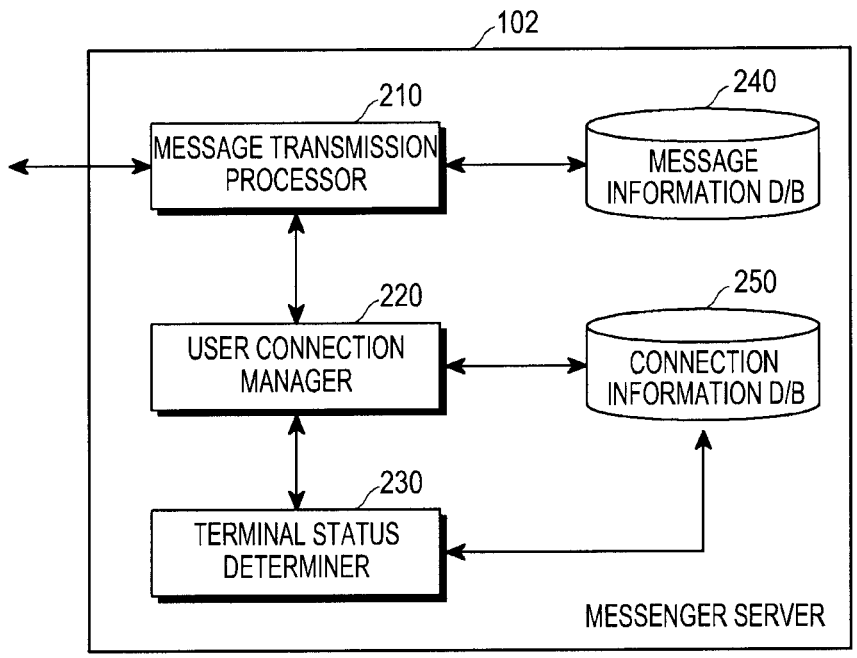
FIG. 2 illustrates an example messenger server according to an embodiment of the present disclosure.
FIG. 3 illustrates an example connection status management table for multiple devices according to an embodiment of the present disclosure.

FIG. 2 illustrates an example messenger server according to an embodiment of the present disclosure. Referring to FIG. 2, the messenger server 102 may include a message transmission processor 210, a user connection manager 220, and a terminal status determiner 230. The messenger server 102 may further include at least one of a message information database 240 or a connection information database 250. Each of the databases may be built to be incorporated into the messenger server 102, or may be built as a separate database server.

The message transmission processor 210 may receive messages from the user terminals 100 (from FIG. 1) intended for the respective conversation partners, and sends the message to the appropriate one of the user terminals 100 for the designated conversation partner.

The message information database 240 may be provided to store messages.

The user connection manager 220 may detect each user terminal's connection status to the messenger service, and may manage or enable the message transmission processor 210 in the encoding, composition or transmission of messages depending on a target user's connection status.

The connection information database 250 may store information regarding each user's connection status. Thus, the user connection manager 220 may retrieve and analyze information about the connection status from the connection information database 250.

The interworking of the components may be illustrated in the following examples.

According to an embodiment of the present disclosure when one user accesses the messenger service using a plurality of user terminals, the message transmission processor 210 may send a message to the plurality of user terminals (e.g., a recipient's user terminal and a sender's another user terminal or a plurality of recipient's user terminals).

The user connection manager 220 may check the connection status (e.g., 'Active' status or 'Inactive' status) for the each recipient user terminal of the plurality of recipient user terminals, and transmit the message to each terminal differently depending on the connection status.

For example, if the user terminal receiving a message is in the 'Active' status, the message transmission processor 210 may transmit active status information by including it in the message to be sent. On the other hand, if the user terminal that will receive a message is in the 'Inactive' status, the message transmission processor 210 may transmit inactive status information by including it in the message to be sent.

According to an embodiment of the present disclosure, upon receiving the message including the status information, each user terminal 100 may retrieve the status information included in the received message, and disable the message reception notification function if the status information indicates that the terminal is in an 'Inactive' state. Accordingly, upon receiving the message, the user terminal 100, which is now unused by the user, may disable separate message reception notification by turning off the message reception notification function according to the inactive status information, thereby preventing unnecessary message reception notifications and reducing battery consumption.

If one user accesses the messenger service using a plurality of user terminals, the terminal status determiner 230 may determine whether each of the terminals is presently in use, and update the user terminal's connection status information stored in the connection information database 250. For example, in FIG. 1, a first user sends a message using the user terminal A1 $100a_1$, which is in communication, via the messenger service, with a plurality of user terminals (e.g., the user terminal A1 $100a_1$ and the user terminal A2 $100a_2$). The terminal status determiner 230 may determine the status of the transmitting terminal A1 $100a_1$ as the 'Active' status, and the status of the recipient terminal A2 $100a_2$ as the 'Inactive' status. Accordingly, the connection statuses of the user terminal A1 $100a_1$ and the user terminal A2 $100a_2$ may be stored in the connection information database 250 as 'Active' and 'Inactive', respectively, as illustrated in FIG. 3.

FIG. 3 illustrates a connection status management table for multiple devices according to an embodiment of the present disclosure. The connection information database 250 may store connection status information for each of user terminal connected to the messenger service. In addition, the last message transfer time information may also be stored.

For example, when the user accesses the messenger service with the user terminal A1 $100a_1$ and the user terminal A2 $100a_2$, the terminal status determiner 230 may determine the user terminal presently used by the user, and stores each user terminal's connection status information. For example, as illustrated in FIG. 3, the connection status for the user terminal A1 $100a_1$ may be stored as the 'Active' status, and the connection status for the user terminal A2 $100a_2$ may be stored as the 'Inactive' status.

The terminal status determiner 230 may thus store and manage the connection status information depending on whether each user terminal is currently in use, so that the currently unused user terminal may disable the message reception notification function.

Further, by storing the last message transfer time information for each user terminal as illustrated in FIG. 3, the messenger server 102 may enable a specific user terminal to be automatically switched to the 'Inactive' status if the user terminal has sent no message in its 'Active' status for a predetermined time T.

According to another embodiment of the present disclosure, whether the current status is the 'Active' status or the 'Inactive' status may be determined on the current connection status between the messenger server and the user terminal, rather than the information stored in the database. For example, when the user sends a message, the messenger server may determine the status of the user's user terminal as the 'Active' status or 'Inactive' status depending on whether each user terminal is connected (e.g., TCP-connected) to the messenger server.

Figure 4:
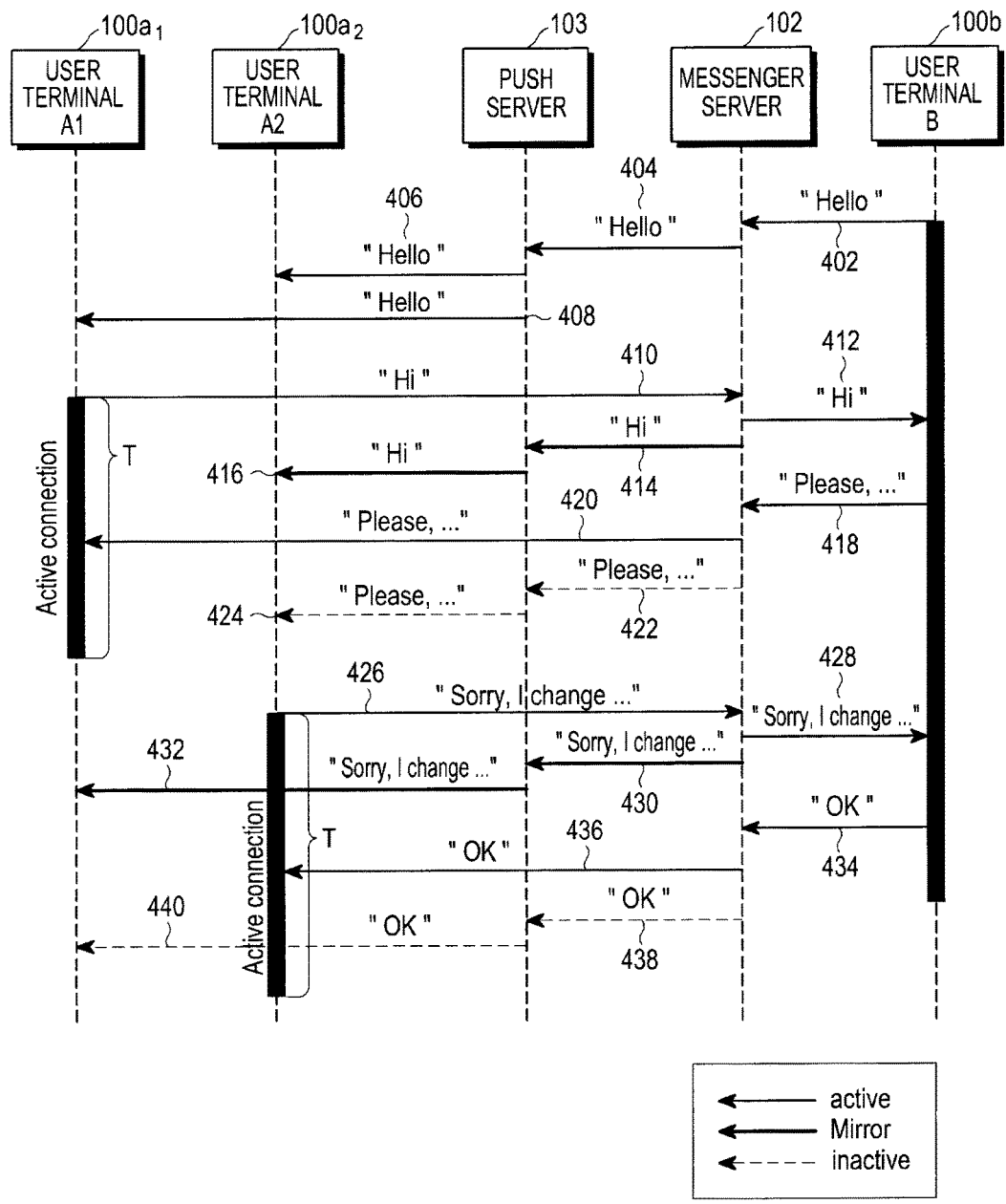
FIG. 4 illustrates an example sent-message management procedure in a messenger service according to an embodiment of the present disclosure.

FIG. 4 illustrates a sent-message management procedure in a messenger service according to an embodiment of the present disclosure. Referring to FIG. 4, a user A may access the messenger server 102 with a user terminal A1 $100a_1$ and a user terminal A2 $100a_2$, and exchange a message with a user terminal B 100b. By managing each user terminal's status information according to an embodiment of the present disclosure in the multi-device situation, the messenger server 102 may prevent unnecessary message reception notifications.

In FIG. 4, the user A has accessed the messenger server 102 with the user terminal A1 $100a_1$ and the user terminal A2 $100a_2$. The user A transmits a message to user terminal B 100b. A response message sent from user terminal B 100b to user A may be sent to both user terminal A1 $100a_1$ and user terminal A2 $100a_2$.

For example, if the user of the user terminal B 100b enters a message "Hello" in a message input window of a messenger application and instructs the user terminal 100b to send the message to the user A, the message "Hello" may be sent to the user terminal A1 $100a_1$ and the user terminal A2 $100a_2$ through the messenger server 102 and the push server 103 (402, 404, 406 and 408). Upon receiving the message from the user terminal B 100b, the user A may send a response message to the user terminal B 100b with the user terminal A1 $100a_1$. For example, if the user of the user terminal A1 $100a_1$ enters a message "Hi" in a message input window of a messenger application and instructs the user terminal A1 $100a_1$ to send the message to the user terminal B 100b, the message "Hi" requested to be sent may be sent to the user terminal B 100b through the messenger server 102 (410 and 412).

For synchronization of the exchanged message, the messenger server 102 may send the message requested to be sent by the user terminal A1 $100a_1$ to the user terminal A2 $100a_2$ (414 and 416). As stated above, the message that is sent to another user terminal of a single user will be referred to as a "mirror message." The mirror message that was sent to the user terminal A2 $100a_2$ may be sent to the user terminal A2 $100a_2$ through the push server 103. In this case, the user terminal A2 $100a_2$ may not enable the message reception notification with respect to the reception of the mirror message according to an embodiment of the present disclosure. For example, the user terminal A2 $100a_2$ may identify the sender of the received message "Hi" and determine that the received message is a message that is sent from a terminal (e.g., the user terminal A1 $100a_1$) belonging to the same user. If it is determined that the received message is a mirror message sent from the same user, the user terminal A2 $100a_2$ may switch the currently sent message reception notification function to the off status or temporarily disable the message reception notification function, thereby preventing the unnecessary message reception notification.

The messenger server 102 may determine the status of the user terminal A1 $100a_1$ as the 'Active' status, because the messenger server 102 has received a message send request from the user A through the user terminal A1 $100a_1$. Accordingly, recent activity may be an indicator of an 'Active' status. According to an embodiment of the present disclosure, the messenger server 102 may determine the status of the other user terminal (e.g., user terminal A2 $100a_2$) for the user A as the 'Inactive' status, because activity was not received from the other terminal A2 $100\ a_2$.

Next, if the user terminal B 100b requests the messenger server 102 to send a message "Please, . . . " to the user A, the messenger server 102 may send the message to the user terminal A1 $100a_1$ and the user terminal A2 $100a_2$, which are the terminals associated to the user A. Since the status of the user terminal A1 $100a_1$ is the 'Active' status, a normal message may be sent to the user terminal A1 $100a_1$ (418 and 420), and the send message "Please, . . . " may be displayed in the messenger conversation window of the user terminal A1 $100a_1$.

On the other hand, since the status of the user terminal A2 $100a_2$ is the 'Inactive' status, the messenger server 102 may transmit the 'Inactive' status information to the user terminal A2 $100a_2$ by adding the information into the message. The message that is sent to the user terminal A2 $100a_2$ may be sent through the push server 103 (422 and 424). The user terminal A2 $100a_2$ may retrieve the 'Inactive' status information included in the received message, and switch the message reception notification function to the off status or temporarily disable the message reception notification function, so that the user terminal A2 $100a_2$ does not provide a reception notification for the message "Please, . . . ".

Information about the time at which the user terminal A1 $100a_1$ last sent a message may be stored in the database, as illustrated in FIG. 3. The user terminal A1 $100a_1$ may start a timer beginning at the time the user terminal A1 $100a_1$ sent the message, and if a predetermined time T has elapsed, the user terminal A1 $100a_1$ may automatically switch its status from 'Active' status to the 'Inactive' status.

After sending a message with the user terminal A1 $100a_1$, the user A may send a message using the user terminal A2 $100a_2$. For example, if the user A requests the messenger server 102 to send a message "Sorry, I change . . . " to the user B 100b using the user terminal A2 $100a_2$ (426), the messenger server 102 may send the message "Sorry, I change . . . " to the user terminal B 100b in response to the request (428).

As described above, based on the message send request from the user terminal A2 $100a_2$, the messenger server 102 may determine that the user that has accessed the messenger service with multiple devices, and may send a mirror message to another connected user terminal (e.g., the user terminal A1 $100a_1$). Therefore, the messenger server 102 may send the message "Sorry, I change . . . " to the user terminal A1 $100a_1$ through the push server 103 (430 and 432).

According to an embodiment of the present disclosure, the messenger server 102 may change the status of the user terminal A2 $100a_2$ to the 'Active' status based on the message send request from the user terminal A2 $100a_2$. Accordingly, the status of the user terminal A1 $100a_1$ may be changed to the 'Inactive' status.

Upon receiving the message "Sony, I change . . . " through the push server 103, the user terminal A1 $100a_1$ may identify the sender of the received message, determine that the received message is a mirror message, and disable the message reception notification function according to an embodiment of the present disclosure, as described above.

Next, if the user terminal B 100b requests the messenger server 102 to send a message "OK" to the user A, the messenger server 102 may transmit the message to the user terminal A $100a_1$ and the user terminal A2 $100a_2$ for the user A. Since the status of the user terminal A2 $100a_2$ is the 'Active' status, a normal message may be sent to the user terminal A2 $100a_2$ (434 and 436), and the send message "OK" may be displayed in the messenger conversation window of the user terminal A2 $100a_2$.

On the other hand, since the status of the user terminal A1 $100a_1$ is the 'Inactive' status, the messenger server 102 may transmit the 'Inactive' status information to the user terminal A1 $100a_1$ by adding it in the message to be sent, according to an embodiment of the present disclosure. The message that is sent to the user terminal A1 $100a_1$ may be sent through the push server 103 (438 and 440). The user terminal A1 $100a_1$ may check the 'Inactive' status information included in the received message, and switch the message reception notification function to the off status or temporarily disable the message reception notification function, so that the user terminal A1 $100a_1$ does not provide the reception notification for the message "OK".

Information about the time at which the user terminal A2 $100a_2$ last transmitted a message may be stored in the database as illustrated in FIG. 3. The user terminal A2 $100a_2$ may start a timer beginning at the time the user terminal A2 $100a_2$ sent its last message, and if the predetermined time T has elapses before another message is transmitted, the user terminal A2 $100a_2$ may be switched from 'Active' status to the 'Inactive' status.

Figure 5:
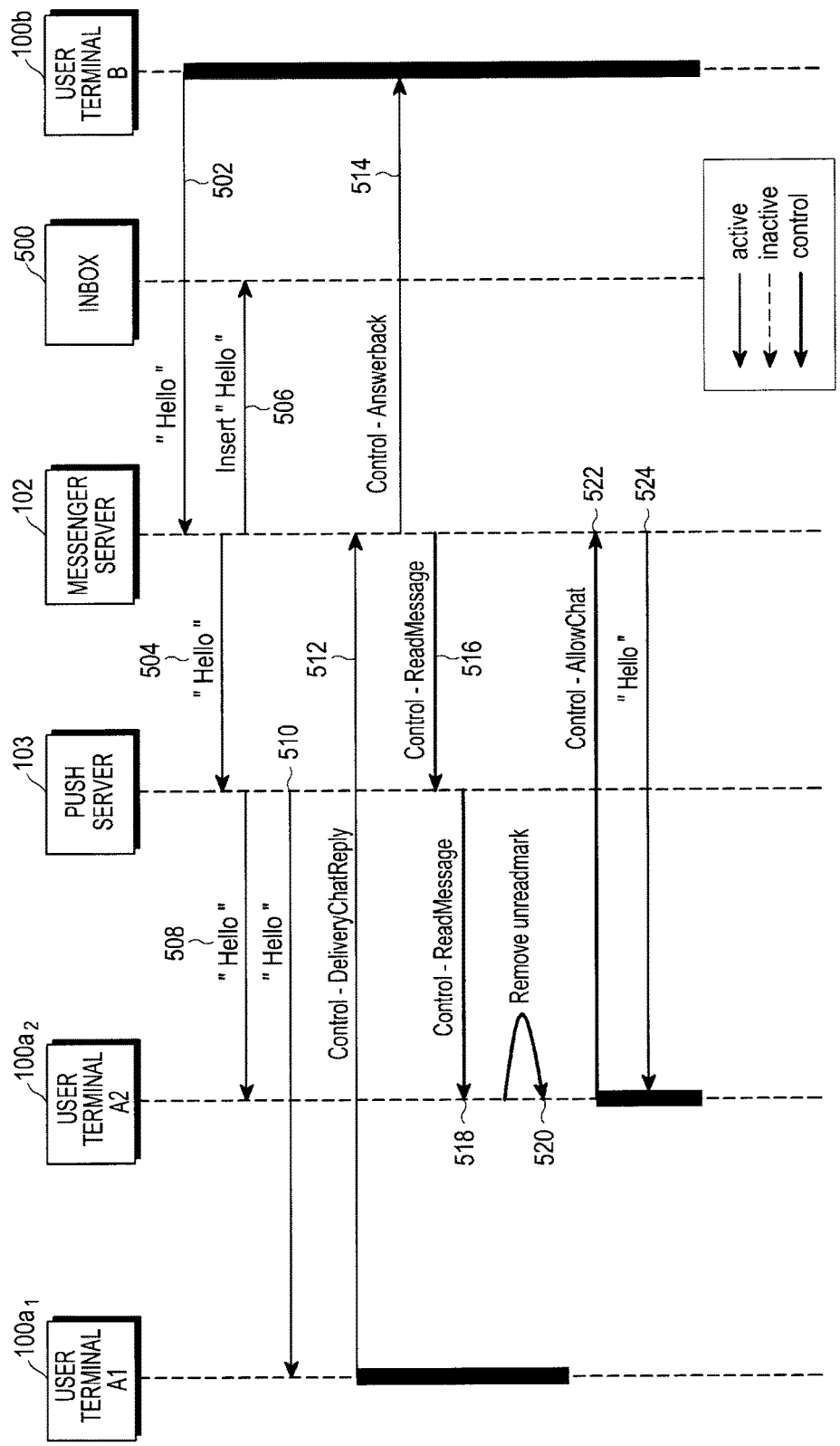
FIG. 5 illustrates an example sent-message management procedure in a messenger service according to another embodiment of the present disclosure.

FIG. 5 illustrates a sent-message management procedure in a messenger service according to another embodiment of the present disclosure. Referring to FIG. 5, the messenger server 102 may provide message delivery and read receipt processing.

For example, when a message unread by a user is displayed in a chat room list, if the user reads the message, a read receipt may be generated and transmitted to, for example, another terminal from which the message originated. To this end, a message delivery and rear receipt processing may be provided using an additional control message (e.g., "ReadMessage") in an embodiment of the present disclosure.

Referring to FIG. 5, the user A may access the messenger server 102 with the user terminal A1 $100a_1$ and the user terminal A2 $100a_2$, and exchange messages with the user terminal B 100b. A message-read receipt function in the multi-device situation may be provided by managing each user terminal's status information.

When the user A sends a message to user terminal B 100b through the messenger server 102 via the user terminal A1

$100a_1$ and the user terminal A2 $100a_2$, the sent message may also be sent to each of the user terminal A1 $100a_1$ and the user terminal A2 $100a_2$.

For example, if the user of the user terminal B 100b enters a message "Hello" in a message input window of a messenger application, and requests the messenger server 102 to send the message to the user A, the message "Hello" requested to be sent may be sent to the user terminal A1 $100a_1$ and the user terminal A2 $100a_2$ through the messenger server 102 and the push server 103 (502, 504, 508 and 510). The messenger server 102 may store the sent message in an inbox or database 500 (506).

If the user A reads the received message "Hello" on the user terminal A1 $100a_1$, the user terminal A1 $100a_1$ may send a control message (e.g., a "DeliveryChatReply" message) indicating the message has been read to the messenger server 102 (512). Upon receiving the control message (e.g., "DeliveryChatReply" message) indicating the message has been read, the messenger server 102 may send a control message (e.g., "Answerback" message) to the user terminal B 100b (514). The user terminal B 100b may display that the user A has read its sent message "Hello," after receiving the control message (e.g., "Answerback" message).

According to an embodiment of the present disclosure, the messenger server 102 may send a control message (e.g., a "ReadMessage") indicating that the message has been read on multiple devices, to the user terminal A2 $100a_2$ connected as multiple devices (516 and 518), thereby making it possible to inform that the message has been read on another user terminal (e.g., the user terminal A1 $100a_1$) associated with a user utilizing multiple devices. Upon receiving the control message (e.g., "ReadMessage"), the user terminal A2 $100a_2$ may remove an unreadmark (for example, the unreadmark may be displayed in numbers in some messenger applications) for the message (520), indicating the message has been read.

For example, if the user A reads the received message on the user terminal A1 $100a_1$, the messenger server 102 may push the control message "ReadMessage" to the user terminal A2 $100a_2$ and the user terminal A2 $100a_2$ may perform message read receipt processing on its User Interface (UI), finding the actual message matching the control message "ReadMessage", determining that the message has been read on another user terminal (e.g., user terminal A1 $100a_1$) for the same user, and updating the UI to reflect the "read" status.

If the user A re-executes the messenger application on the user terminal A2 $100a_2$, a control message (e.g., "AllowChat") may be sent to the messenger server 102 (522), and the unread message 'Hello" may be received from the messenger server 102 (524).

Figure 6:
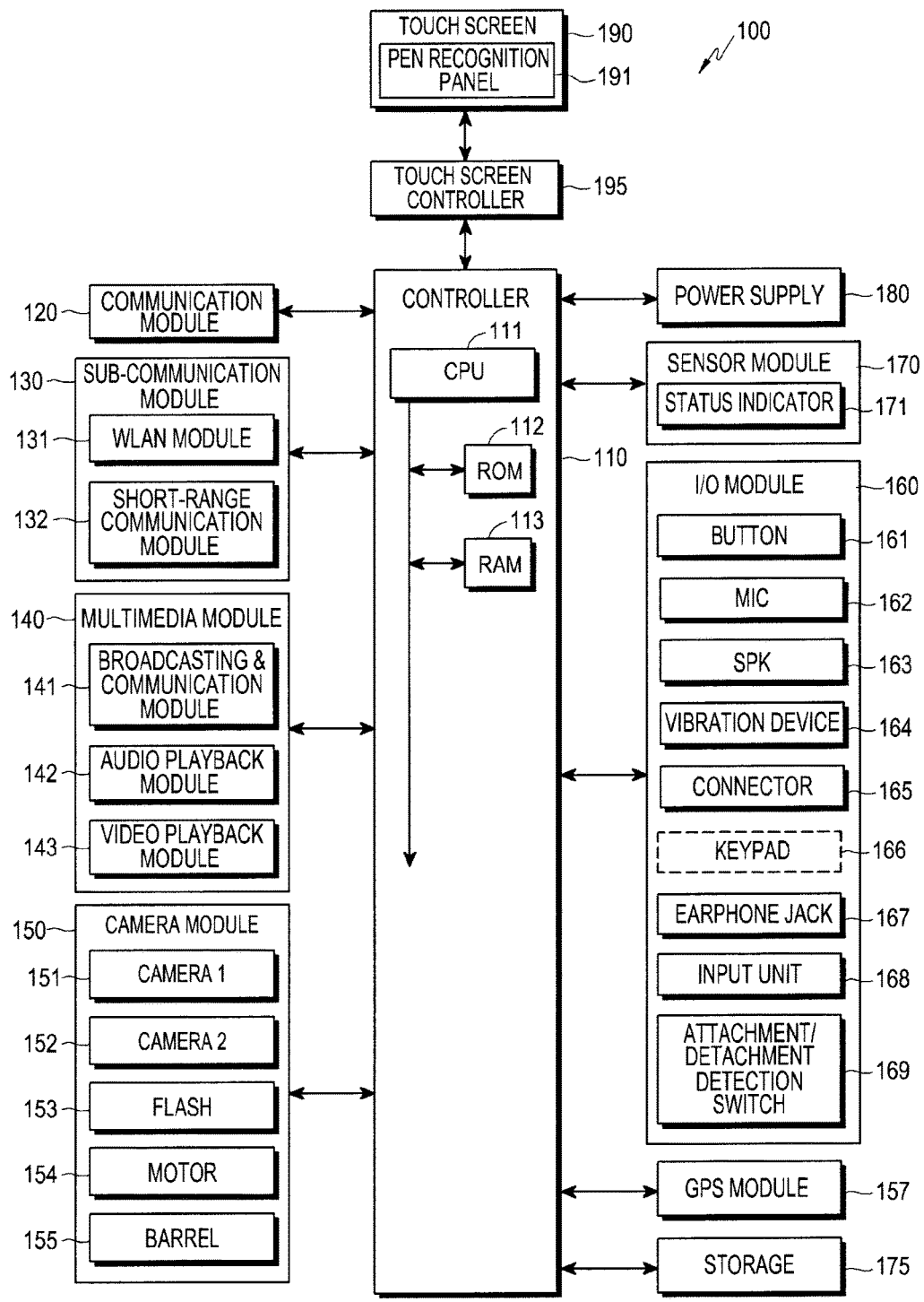
FIG. 6 illustrates an example structure of a user terminal according to an embodiment of the present disclosure.

FIG. 6 illustrates a detailed structure of a user terminal 100 according to an embodiment of the present disclosure. Referring to FIG. 6, the user terminal 100 according to an embodiment of the present disclosure may include at least one of a controller 110, a communication module 120, a multimedia module 140, a camera module 150, an Input/Output (I/O) module 160, a sensor module 170 (with a status indicator 171), a storage 175, a power supply 180, a touch screen 190, or a touch screen controller 195.

Specifically, the user terminal 100 may be connected to external electronic devices (not shown) using at least one of the communication module 120, a connector 165 or an earphone jack 167. The user terminal 100 may be connected, by wires or wirelessly, to another portable device or electronic device (e.g., one of a cellular phone, a smart phone, a tablet PC, a desktop PC and a server).

The communication module 120 may include a mobile communication module (not pictured), a sub-communication module 130, and, in some embodiments, a broadcasting & communication module 141 (depicted as part of a multimedia module 140 here). The sub-communication module 130 may include at least one of a Wireless Local Area Network (WLAN) module 131 or a short-range communication module 132.

The multimedia module 140 may include at least one of an audio playback module 142 or a video playback module 143.

The camera module 150 may include at least one of a first camera 151 or a second camera 152. The camera module 150 may further include a flash 153, a motor 154 and a barrel 155. The I/O module 160 may include at least one of a button(s) 161, a microphone (MIC) 162, a speaker (SPK) 163, a vibration device 164, the connector 165 or a keypad 166.

The controller 110 may include a Central Processing Unit (CPU) 111, a Read Only Memory (ROM) 112 configured to store a control program for control of the user terminal 100, and a Random Access Memory (RAM) 113 configured to temporarily store the signals or data received from the outside of the user terminal 100, or to be used as a workspace for operations performed in the user terminal 100. The CPU 111 may include a single-core processor, a dual-core processor, a triple-core processor, a quad-core processor, or the like. The CPU 111, the ROM 112 and the RAM 113 may be interconnected through an internal bus.

The controller 110 may control at least one of the communication module 120, the multimedia module 140, the camera module 150, the I/O module 160, the sensor module 170, the storage 175, the power supply 180, the touch screen 190, or the touch screen controller 195.

The controller 110 may detect proximity of an input unit 168 to the touch screen 190, or a user input event such as a hovering event which may occur as the input unit 168 is in proximity to the touch screen 190. The controller 110 may detect various user inputs received not only through the touch screen 190, but also through the camera module 150, the I/O module 160, the sensor module 170 and the like. The user input may include not only the direct/indirect touch, but also various types of information being input to the user terminal 100, such as user's gesture, voice, eye movements, iris information, bio signals and the like. The controller 110 may control the user terminal 100 to perform a predetermined operation or function corresponding to the detected user input. The controller 110 may output a control signal to the input unit 168 or the vibration device 164. The control signal may include information about a vibration pattern, and the input unit 168 or the vibration device 164 may generate vibrations corresponding to the vibration pattern.

The user terminal 100 may include at least one of the mobile communication module 1 (not depicted), the WLAN module 131 or the short-range communication module 132 depending on its performance or configuration.

The mobile communication module, under control of the controller 110, may connect the user terminal 100 to the external electronic devices by mobile communication using at least one or multiple antennas (not shown). The mobile communication module may transmit and receive wireless signals for voice calls, video calls, Short Message Service (SMS) messages or Multimedia Messaging Service (MMS) messages, to/from a cellular phone (not shown), a smart phone (not shown), a tablet PC (not shown) or other electronic devices (not shown), a phone number of each of which is entered or registered in the user terminal 100.

The sub-communication module 130 may include at least one of the WLAN module 131 or the short-range communication module 132. For example, the sub-communication module 130 may include any one or both of the WLAN module 131 and the short-range communication module 132.

The WLAN module 131, under control of the controller 110, may access the Internet in the place where a wireless Access Point (AP) is installed. The WLAN module 131 may support the WLAN standard IEEE 802.11x defined by the Institute of Electrical and Electronics Engineers (IEEE). The short-range communication module 132, under control of the controller 110, may enable wireless short-range communication between the user terminal 100 and the external electronic devices. The short-range communication scheme may include Bluetooth, Infrared Data Association (IrDA), WiFi-Direct, Near Field Communication (NFC) and the like.

The broadcasting & communication module 141, under control of the controller 110, may receive broadcast signals (e.g., TV broadcast signals, radio broadcast signals, data broadcast signals or the like) and additional broadcast information (e.g., Electric Program Guide (EPG), Electric Service Guide (ESG) or the like) transmitted from the broadcasting stations, through a broadcasting & communication antenna (not shown).

The multimedia module 140 may include the audio playback module 142 or the video playback module 143. The audio playback module 142, under control of the controller 110, may play digital audio files (with a file extension of, for example, mp3, wma, ogg or way), which are stored in the storage 175 or received from the outside of the user terminal 100. The video playback module 143, under control of the controller 110, may play digital video files (with a file extension of, for example, mpeg, mpg, mp4, avi, mov, or mkv), which are stored in the storage 175 or received from the outside of the user terminal 100. The multimedia module 140 may be incorporated into the controller 110.

The camera module 150 may include at least one of the first camera 151 or the second camera 152, which may capture or shoot still images, videos or panoramic pictures under control of the controller 110. In addition, the camera module 150 may include at least one of the barrel 155 for performing a zoom-in/out operation to shoot a subject, the motor 154 for controlling movements of the barrel 155, or the flash 153 for providing the secondary light source needed to shoot a subject. The first camera 151 may be disposed on the front of the user terminal 100, while the second camera 152 may be disposed on the rear of the user terminal 100.

The I/O module 160 may include at least one of at least one button 161, at least one microphone 162, at least one speaker 163, at least one vibration device 164, the connector 165, the keypad 166, the earphone jack 167, or the input unit 168. The I/O module 160 is not limited thereto, and may be provided to control movements of a cursor on the touch screen 190 by a cursor controller such as a mouse, a trackball, a joystick, cursor direction keys, or the like.

The button 161 may be formed on the front, side or rear of the housing (or casing) of the user terminal 100, and may include at least one of a Power/Lock button, a Volume button, a Menu button, a Home button, a Back button, or a Search button. The microphone 162, under control of the controller 110, may generate electrical signals by receiving or picking up the voice or sound. The speaker 163, under control of the controller 110, may output the sounds corresponding to a variety of signals or data (e.g., wireless data, broadcast data, digital audio data, digital video data and the like) to the outside of the user terminal 100. The speaker 163 may output the sounds (e.g., button manipulation tones for calls, Ring Back Tones (RBT), the other party's voice and the like) corresponding to the function executed by the user terminal 100. One or multiple speakers 163 may be formed in a proper position or positions of the housing of the user terminal 100.

The vibration device 164, under control of the controller 110, may convert electrical signals into mechanical vibrations. For example, upon receiving a voice or video call from another device (not shown), the user terminal 100 in a vibration mode may enable the vibration device 164. One or multiple vibration devices 164 may be formed in the housing of the user terminal 100. The vibration device 164 may operate in response to a user input through the touch screen 190.

The connector 165 may be used as an interface for connecting the user terminal 100 to external electronic devices or a power source (not shown). The controller 110 may transmit the data stored in the storage 175 of the user terminal 100 to the external electronic devices, or receive data from the external electronic devices, via a wired cable connected to the connector 165. The user terminal 100 may receive power from the power source or charge its rechargeable battery (not shown) using the power source, through a wired cable connected to the connector 165.

The keypad 166 may receive key inputs from the user, for control of the user terminal 100. The keypad 166 may include a physical keypad (not shown) formed on the user terminal 100, and/or a virtual keypad (not shown) displayed on the touch screen 190. The physical keypad formed on the user terminal 100 may be optional depending on the performance or structure of the user terminal 100. An earphone (not shown) may be inserted into the earphone jack 167 and connected to the user terminal 100.

The input unit 168 may be inserted and kept in the user terminal 100, and may be pulled out or separated from the user terminal 100 during its use. In a predetermined area inside the user terminal 100, in which the input unit 168 is inserted, may be mounted an attachment/detachment detection switch 169 that operates in response to the attachment/detachment of the input unit 168. The attachment/detachment detection switch 169 may output a signal corresponding to the attachment/detachment of the input unit 168 to the controller 110. The attachment/detachment detection switch 169 may be configured to be in direct/indirect contact with the input unit 168 when the input unit 168 is inserted in the user terminal 100. Accordingly, the attachment/detachment detection switch 169 may generate a signal (e.g., a signal indicating the insertion/separation of the input unit 168) corresponding to the insertion/separation of the input unit 168 based on whether the attachment/detachment detection switch 169 is in contact with the input unit 168, and output the generated signal to the controller 110.

The sensor module 170 may include at least one sensor for detecting a status of the user terminal 100. For example, the sensor module 170 may include at least one of a proximity sensor (not shown) for detecting whether the user is in proximity to the user terminal 100, an illuminance sensor (not shown) for detecting the amount of light around the user terminal 100, a motion sensor (not shown) for detecting movements (e.g., rotation, acceleration, vibration or the like) of the user terminal 100, a geo-magnetic sensor (not shown) for detecting the point of the compass for the user terminal 100 using the Earth's magnetic field, a gravity sensor (not shown) for detecting the direction of the gravity, an altimeter (not shown) for detecting the altitude by measuring the atmospheric pressure, or the like.

A Global Positioning System (GPS) module 157 may receive radio waves from a plurality of GPS satellites (not shown) in the Earth orbit, and calculate the location of the user terminal 100 using the Time of Arrival (ToA) from the GPS satellites to the user terminal 100.

The storage 175, under control of the controller 110, may store the signals or data which are input/output according to operations of the communication module 120, the multimedia module 140, the camera module 150, the I/O module 160, the sensor module 170 and/or the touch screen 190. According to an embodiment of the present disclosure, the storage 175 may store a variety of status information and setting information for the user terminal 100.

The storage 175 may store applications and a control program for control of the user terminal 100 or the controller 110. Any one of the control program and the applications may be a messenger client application which is installed according to an embodiment of the present disclosure.

The term 'storage' may refer to any data storage device such as the storage 175, the ROM 112 and the RAM 113 in the controller 110, and a memory card (e.g., Secure Digital (SD) card, memory stick and the like) mounted in the user terminal 100. The storage 175 may include a non-volatile memory, a volatile memory, a Hard Disk Drive (HDD) or a Solid State Drive (SSD).

The storage 175 may store applications having a plurality of functions such as a navigation application, a video call application, a game application and a time-based alarm application; images for providing Graphical User Interfaces (GUIs) associated with the applications; databases or data associated with the user information, documents and the way to handle touch inputs; background images (e.g., menu screen, standby screen and the like) or application programs needed to drive the user terminal 100; and images captured by the camera module 150.

The storage 175 is a machine (e.g., computer)-readable medium, and the term 'machine-readable medium' may be defined as a medium that provides data to the machine so that the machine may execute a specific function. In addition, the storage 175 may include non-volatile media and volatile media. All of these media should be configured such that commands carried by the media may be detected by a physical mechanism that reads the commands by the machine.

The machine-readable medium may include, though not limited to, at least one of floppy disk, flexible disk, hard disk, magnetic tape, Compact Disc Read-Only Memory (CD-ROM), optical disk, punch card, paper tape, RAM, Programmable Read-Only Memory (PROM), Erasable PROM (EPROM), FLASH-EPROM, or embedded Multi Media Card (eMMC).

The power supply 180, under control of the controller 110, may supply to one or multiple rechargeable batteries mounted in the housing of the user terminal 100. The one or multiple rechargeable batteries may supply power to the user terminal 100. The power supply 180 may supply, to the user terminal 100, the power that is received from the external power source via a wired cable connected to the connector 165. The power supply 180 may supply, to the user terminal 100, the power that is received from the external power source wirelessly by wireless charging technology.

The user terminal 100 may include at least one touch screen 190 that provides GUIs corresponding to a variety of services (e.g., call, data transfer, broadcasting, photo shooting and the like), to the user. The touch screen 190 may output, to the touch screen controller 195, the analog signal corresponding to at least one user input that is applied to the GUIs.

The touch screen 190 may receive at least one user input through the user's body (e.g., fingers including the thumb) or the input unit 168 (e.g., a stylus pen, an electronic pen and the like). The touch screen 190 may be implemented in, for example, a resistive type, a capacitive type, an infrared type, an acoustic wave type, or a combination thereof.

The touch screen 190 may include at least two touch panels that can detect the touch or approach of the finger and the input unit 168 with/to the touch screen 190, respectively, so that the touch screen 190 may separately receive user inputs by the finger and the input unit 168. The at least two touch panels may provide different output values to the touch screen controller 195, and the touch screen controller 195 may differently recognize the values received from the at least two touch screen panels, and determine whether an input from touch screen 190 is an input by the finger or an input by the input unit 168.

The touch is not limited to the direct contact (or contact touch) between the touch screen 190 and the user's body or the touch input means, and may include indirect contact (or noncontact touch) between touch screen 190 and the user's body or the touch input means (with a detectable gap between them set as, for example, 1 mm or less. The detectable gap on the touch screen 190 may be subject to change depending on the performance or structure of the user terminal 100.

The touch screen controller 195 may convert an analog signal received from the touch screen 190 into a digital signal, and transmit the digital signal to the controller 110. The controller 110 may control the touch screen 190 using the digital signal received from the touch screen controller 195. The touch screen controller 195 may determine not only the user input's position but also the hovering gap or distance by detecting values (e.g., current values and the like) output from the touch screen 190, convert the determined hovering distance value into a digital signal (e.g., Z coordinates), and provide the digital signal to the controller 110. The touch screen controller 195 may determine the pressure at which the touch input means presses the touch screen 190, by detecting the values (e.g., current values and the like) output through the touch screen 190, convert the determined pressure value into a digital signal, and provide the digital signal to the controller 110.

Embodiments of the present disclosure disclose an apparatus and method for managing sent messages in a messenger server, to provide message reception notification to the currently used user terminal by distinguishing the currently used user terminal from unused user terminals in a multi-device messenger service environment in which one user enjoys the messenger service on multiple user terminals.

Other embodiments of the present disclosure disclose an apparatus and method for managing sent messages in a messenger server, to ensure real-time synchronization between multiple user terminals with respect to message-read processing by distinguishing the currently used user terminal from unused user terminals.

In the above-described embodiments of the present disclosure, the terms "active connection" and "inactive connection" will be used to distinguish the currently used user terminal from unused user terminals among a plurality of user terminals. However, the embodiments of the present disclosure are not limited to the specific terms, and the terms are used for a better understanding of the embodiments of the present disclosure.

The active connection may be managed on a chat room basis, and may refer to the last communication connection between a server and a client while a user terminal (or client) is connected to a messenger server by Transmission Control Protocol (TCP).

Therefore, according to an embodiment of the present disclosure, the messenger server may transmit a flag (Active, Inactive) indicating 'Active' or 'Inactive' by including or inserting it in a message. As to a transmission method for the flag, the messenger server may transmit the flag by including it in a message of the existing protocol, or transmit the flag by including it in a new message.

The 'Active' status may correspond to the same operation as that of the typical message transmission method, and an embodiment of the present disclosure may be implemented to send a message to a user terminal in an active connection status among a plurality of connected user terminals depending on the status information. If there is no user terminal in the 'Active' status among the plurality of connected user terminals, the messenger server may send messages, regarding statuses of all the connected user terminals as the active connection status.

The 'Inactive' status may correspond to the user terminals which are not in the 'Active' status, and in the 'Inactive' status, the messenger server may perform a separate message transmission process according to an embodiment of the present disclosure. For example, if a message is sent to a user terminal in the 'Inactive' status, a message reception notification function may be disabled according to an embodiment of the present disclosure.

If a messenger application in all user terminals among the plurality of connected user terminals for a specific user is not connected to the messenger server, the messenger server may send a message, a status of which is set as the 'Active' status, to all the user terminals. In this case, upon receiving the message including an 'Active' status flag, all the user terminals may generate message reception notification such as an alarm, vibrations, a pop-up message and the like.

According to an embodiment of the present disclosure, the switching condition to the 'Active' status may be implemented in various ways. For example, in the case where a user reads the entire contents of a received message or send a message to the conversation partner on one device, the messenger server may determine that the 'Active' status is started from this time on since the device is connected to the messenger server. At this point, the messenger server may send a message to the other user terminals by setting it as the 'Inactive' status. In the case where the user does not watch the chat room in the 'Active' status (e.g., the screen is turned off, or the user has moved to another screen), a timer of a predetermined time (e.g., 5 minutes) is generated for the user terminal, and the user terminal may be automatically switched to the 'Inactive' status after a lapse of the predetermined time. Alternatively, the user terminal may be switched to the 'Inactive' status, upon receiving a 'Disconnect Request' message from the messenger server, or if there is no response of the user terminal. The 'Disconnect Request' message sent from the messenger server may be forwarded to the user terminal if there is no sent message in the 'Active' status for a predetermined time.

In embodiments of the present disclosure, each function block or module may refer to a functional or structural combination of hardware for implementing the technical idea of the present disclosure and software for driving the hardware. For example, each function block may refer to the logical unit of predetermined code and hardware resources for implementing the predetermined code, and it will be apparent to those of ordinary skill in the art that the function block does not necessarily refer to the physically connected code or a kind of hardware.

The method for managing sent messages in a messenger service according to an embodiment of the present disclosure may be implemented in the form of a program command that can be executed by a variety of computer means, and may be recorded in a computer-readable recording medium. The computer-readable recording medium may include a program command, a data file, a data structure and the like alone or in combination. The program command recorded in the medium may be a program command that is designed and configured especially for the present disclosure, or may be an available program command known to those skilled in the art of computer software. Examples of the computer-readable recording medium may include magnetic media such as hard disk, floppy disk and magnetic tape; optical media such as Compact Disk Read Only Memory (CD-ROM) and Digital Versatile Disk (DVD); magneto-optical media such as floptical disk; and a hardware device especially configured to store and execute a program command, such as Read Only Memory (ROM), Random Access Memory (RAM) and flash memory. Examples of the program command may include not only the machine code which is made by a compiler, but also the high-level language code which can be executed by the computer using an interpreter and the like. The hardware device may be configured to operate as one or more software modules to perform the operation proposed by the present disclosure, and vice versa.

As described above, the user terminal 100 according to an embodiment of the present disclosure may be implemented as a variety of electronic devices. An example of the electronic device having this configuration may include a smart phone.

For example, according to an embodiment of the present disclosure, the user terminal 100 may be any electronic device having a communication unit and a display, and may refer to a camera, a portable device, a mobile terminal, a communication terminal, a portable communication terminal, a portable mobile terminal and the like. For example, the electronic device may be a digital camera, a smart phone, a cellular phone, a game console, a Television (TV), a display device, a car head unit, a notebook computer, a laptop computer, a tablet computer, a Personal Multimedia Player (PMP), a Personal Digital Assistants (PDA), a navigation device, an Automatic Teller Machine (ATM) for banks, a Point Of Sale for shops, and the like. In addition, the electronic device in the present disclosure may be a flexible device or a flexible display device.

An example of this electronic device is for a portable terminal (e.g., a cellular phone, a smart phone and the like), and some of the components of the below-described electronic device may be omitted or modified as needed.

Information about the methods for managing sent messages in a messenger server may be stored in a computer-readable recording medium. This recording medium may include any type of recording medium in which programs and data may be stored to be read by the computer system. For example, the recording medium may include Read Only Memory (ROM), Random Access Memory (RAM), Compact Disk (CD), Digital Video Disk (DVD)-ROM, magnetic tape, floppy disk, optical data storage device, embedded Multi Media Card (eMMC) and the like, and may also include a medium that is implemented in the form of carrier waves (e.g., transmission over the Internet). This recording medium may be distributed to the computer systems connected over the network, and computer-readable code may be stored and executed in the recording medium in a distributed manner.

As is apparent from the foregoing description, according to an embodiment of the present disclosure, it is possible to increase the efficiency of the messenger service and reduce the battery consumption by dynamically managing the connection of the user terminal currently used by the user in the multi-device messenger service environment in which the same user enjoys the messenger service on multiple user terminals.

In addition, according to an embodiment of the present disclosure, each of a plurality of user terminals used by the user may optimize the battery consumption for a message sent by the user terminal itself, and may ensure real-time message synchronization between the multiple user terminals.

Further, according to an embodiment of the present disclosure, message reception notification may be minimized for the other user terminals except for the user terminal currently used by the user among a plurality of user terminals used by the same user, thereby making it possible to increase the usability in the multi-device messenger service environment.

Moreover, according to an embodiment of the present disclosure, message reception notification may not be unnecessarily provided to a plurality of user terminals used by the same user, and message-read processing may be synchronized in real time.

While the disclosure has been shown and described with reference to certain example embodiments thereof, it will be understood by those skilled in the art that various changes in form and details may be made therein without departing from the ambit of the disclosure as defined by the appended claims and their equivalents.

What is claimed is:

1. A method for managing sent messages in a messenger server, the method comprising:
   receiving a message from a first user terminal, the first user terminal associated with a first user account;
   detecting a second user terminal from among a plurality of user terminals associated with the first user account; and
   transmitting the message received from the first user terminal to the detected second user terminal,
   wherein when the second user terminal receives the message received from the first user terminal via the messenger server, a sender of the received message is identified, and generation of a notification for receiving the message received from the first user terminal is suppressed in response to determining that the sender is the first user terminal belonging to the first user account of a same user,
   wherein when read receipt information, indicating that a message from a third user terminal was read on the first user terminal, is received from the first user terminal, the read receipt information is transmitted to the second user terminal, and
   wherein the second user terminal removes an unreadmark for the message from the third user terminal in response to receiving the read receipt information.

2. The method of claim 1, further comprising setting a status of the detected second user terminal as inactive.

3. The method of claim 2, further comprising:
   receiving a second message addressed to the first user account from a user terminal associated with a second user account;
   transmitting the second message to the first user terminal;
   inserting, into the second message, information indicating an inactive status; and
   transmitting the second message with the inserted information to the second user terminal in a form of a push message.

4. The method of claim 3, wherein the information causes the second user terminal to disable a message notification function.

5. The method of claim 4, wherein the message notification function includes at least one of a displayed status indicator, a haptic vibration, an acoustic notification, and a displayed pop-up window.

6. The method of claim 1, further comprising:
   identifying an active status or inactive status of the detected second user terminal based on whether a screen of the detected second user terminal is turned on or off;
   wherein the message received from the first user terminal and status information is transmitted to the detected second user terminal based on whether the detected second user terminal is in the active status or the inactive status.

7. A method for managing a messenger server, the method comprising:
   receiving a message to be transmitted to a first user account, the message received from a user terminal associated with a second user account, wherein a plurality of user terminals is associated with the first user account;
   classifying a first user terminal among the plurality of user terminals as an active user terminal, if a communicative connection exists between the first user terminal and the messenger server;
   classifying a second user terminal among the plurality of user terminals as an inactive user terminal, if the communicative connection does not exist between the second user terminal and the messenger server;
   transmitting the message to the active user terminal;
   inserting, into the message, information indicating an inactive status; and
   transmitting the message, including the information, to the inactive user terminal in a form of a push message, wherein the information causes the inactive user terminal to disable a message notification function,
   wherein when the inactive user terminal receives the message including the information transmitted from the messenger server, a sender of the received message is identified, and generating a notification for receiving the message is suppressed in response to determining that the sender is the first user terminal belonging to the first user account of a same user,
   wherein when read receipt information, indicating that a message from a third user terminal was read on the first user terminal, is received from the first user terminal, the read receipt information is transmitted to the second user terminal, and
   wherein the second user terminal removes an unreadmark for the message from the third user terminal in response to receiving the read receipt information.

8. The method of claim 7, wherein the message notification function on the inactive user terminal includes at least one of a displayed status indicator, a haptic vibration, an acoustic notification, and a displayed pop-up window, and wherein the received message is part of a message thread including a plurality of messages, and generation of the notification is suppressed only for the received message.

9. The method of claim 7, further comprising setting a status of the user terminal as active, if the user terminal is connected to the messenger server.

10. The method of claim 9, further comprising: setting a status of a third user terminal associated with the second user account as inactive, if the third user terminal is not connected to the messenger server.

11. The method of claim 7, wherein the communicative connection includes a Transmission Control Protocol (TCP) connection established by a TCP handshake operation, and the second user terminal is classified as the inactive user terminal if the TCP connection does not exist between the second user terminal and the messenger server.

12. The method of claim 7, further comprising:
identifying a first user terminal among the plurality of user terminals as an active user terminal, if a screen of the first user terminal is turned on;
identifying a second user terminal among the plurality of user terminals as an inactive user terminal, if a screen of the second user terminal is turned off.

13. A non-transitory computer-readable recording medium storing a program that, when executed by a computer processor, causes the processor to:
receive a message to be transmitted to a first user account, the message received from a user terminal associated with a second user account, wherein a plurality of user terminals is associated with the first user account;
classify a first user terminal among the plurality of user terminals as an active user terminal, if a communicative connection exists between the first user terminal and a messenger server;
classify a second user terminal among the plurality of user terminals as an inactive user terminal, if the communicative connection does not exist between the second user terminal and the messenger server;
transmit the message to the active user terminal;
insert, into the message, information indicating an inactive status; and transmit the message, including the information, to the inactive user terminal in a form of a push message, wherein the information causes the inactive user terminal to disable a message notification function,
wherein when the inactive user terminal receives the message including the information transmitted from the messenger server, the inactive user terminal identifies a sender of the received message, and suppresses generating a notification for the received message in response to determining that the sender is the first user terminal belonging to the first user account of a same user,
wherein when read receipt information, indicating that a message from a third user terminal was read on the first user terminal, is received from the first user terminal, the read receipt information is transmitted to the second user terminal, and
wherein the second user terminal removes an unreadmark for the message from the third user terminal in response to receiving the read receipt information.

14. The non-transitory computer-readable recording medium of claim 13, wherein the communicative connection includes a Transmission Control Protocol (TCP) connection established by a TCP handshake operation, and the second user terminal is classified as the inactive user terminal if the TCP connection does not exist between the second user terminal and the messenger server.

15. A portable terminal, comprising:
a notification module, configured to notify a user that a message is received; and
a processor configured to:
receive, from a messenger server, a message formatted as a push message including information indicating that the portable terminal is presently in an inactive status,
identify a sender of the received message to determine whether the sender is a first user terminal belonging to a first user account of a same user, and
disable the notification module temporarily to suppress generating a notification for the received message in response to determining that the sender is the first user terminal belonging to the first user account of a same user,
wherein when read receipt information, indicating that a message from a second user terminal was read on the first user terminal, is received from the messenger server, an unreadmark for the message from a third user terminal is removed in response to receiving the read receipt information.

16. The portable terminal of claim 15, the processor further configured to:
connect to the messenger server;
transmit a second message to at least one other portable terminal via the messenger server;
receive a third message from the messenger server including information indicating that the portable terminal has an active status, because of a communicative connection to the messenger server; and
generate, via the notification module, a notification for the third message alerting the user to reception of the third message.

17. The portable terminal of claim 15, the processor further configured to:
receive, from a push server, all future messages while the portable terminal has the inactive status,
wherein the messenger server transmits the message to the push server.

18. The portable terminal of claim 15, wherein the notification module is configured to generate at least one of a displayed status indicator, a haptic vibration, an acoustic notification, and a displayed pop-up window, and
wherein the received message is part of a message thread including a plurality of messages, and generation of the notification is suppressed only for the received message.

19. The portable terminal of claim 15, the processor further configured to:
identify an active status or inactive status of the portable terminal based on whether a screen of the portable terminal is turned on or off.

* * * * *